INVENTORS
Robert J. Charno
James J. Murray
Marvin S. Shinbaum
John S. Strance

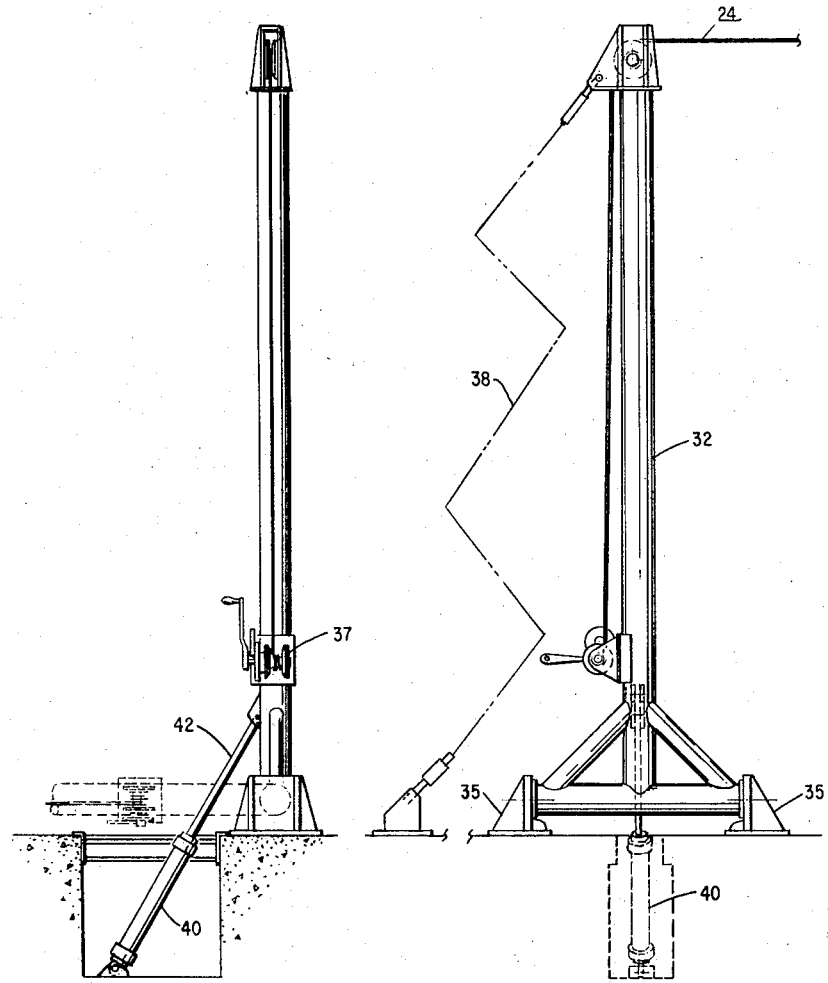

BY

Meyer, Tilberry & Body

United States Patent Office 3,367,608
Patented Feb. 6, 1968

3,367,608
BARRICADE NET ARRESTING SYSTEM
Ronald J. Charno, Drexel Hill, James J. Murray, Havertown, Marvin S. Shinbaum, Springfield, and John S. Strance, Drexel Hill, Pa., assignors to E. W. Bliss Company, Canton, Ohio, a corporation of Delaware
Filed May 25, 1966, Ser. No. 552,952
5 Claims. (Cl. 244—110)

ABSTRACT OF THE DISCLOSURE

The disclosure relates to an aircraft arresting system designed to raise and lower a cross-runway barricade member such as a textile net adapted to be engaged by a distressed aircraft which would otherwise overrun the safe limits of the runway. A pair of stanchions at opposite sides of the runway support the net. Each stanchion is operated by an hydraulic system synchronized by a unified control. A cylinder is actuated by the hydraulic fluid to raise or lower each stanchion in unison. A feature of each hydraulic system includes an automatic accumulator and recharge. During raising or lowering cycles, the hydraulic pressure in each accumulator is quickly restored to its initial balanced value by the recharger to permit rapid sequential raising and lowering operations.

---

The present invention relates to aircraft arresting systems designed to lift and support a textile barricade net until it is engaged by a distressed aircraft which would otherwise overrun the safe limits of a runway.

Heretofore, land based barricade net systems were arranged so that the net was in a relaxed condition when the net stanchions were not erected, thus prohibiting traffic over the net due to the collapsed net obstruction created and the possibility of fouling the net on the aircraft wheel assemblies. Such installations are therefore limited to runways where there is a prepared overrun with the net installed at the extreme end thereof beyond normal aircraft penetration.

Another problem with prior art systems is the slow raising speed of the net stanchions in order to bring the net into the ready position. Present day high speed aircraft traverse the distance to the net in a matter of seconds and it is essential to have a reliable net system capable of quick erection.

A further problem with prior art systems is the height above ground of the net stanchions even in the down position, which to a large extent, tends to interfere with the normal movement of airborne and taxiing aircraft traffic.

The barricade net system of the present invention is directed toward a solution of these and other problems and provides a net stanchion on opposite sides of the runway pivoted for raising and lowering parallel thereto, a cross-runway barricade net extending between the net stanchions and supported thereby in a taut condition both in the raised and lowered positions and a net erection control synchronizing the raising and lowering movements of the net stanchions.

Further in accordance with the invention, each net stanchion is pivoted near ground level so as to have the lowest possible profile when in the down position and is raised and lowered by means of an actuating cylinder pivoted at its lower end substantially below ground level so as to permit lowering of the stanchion to an horizontal position without interference with the cylinder.

In accordance with a further aspect of the invention, the net erection control includes an electro-hydraulic circuit comprising a separate hydraulic system for each stanchion actuating cylinder, an automatic hydraulic pressure and recharge circuit associated with each hydraulic system for pressurizing each system at a uniform pressure so as to insure synchronous operation of the stanchions and a master electrical control circuit for use in initiating the raising and lowering cycles and directing operation of both hydraulic systems comprising an "up" relay, a "down" relay, means for energizing each relay to initiate the raising or lowering of the net and limit switches for interrupting operation at each of the terminal positions of the net.

One object of the invention is to provide an aircraft arresting system comprising a barricade net which can be raised to the ready position by quick erect stanchions in a matter of a few seconds.

Another object is to provide an aircraft arresting system as referred to above suitable for installation at any point on a runway including those without prepared overruns. This is accomplished by retaining the net in a taut condition at all times so that ground traffic can roll over the net without danger of wheel entanglement.

Another object is to provide net stanchions having a very low profile in an horizontal down position which minimizes potential interference to the normal movement of airborne and taxiing aircraft.

Still another object is to provide an electro-hydraulic control capable of synchronizing stanchion operation and bringing the net to the fully raised or lowered position from a remote location such as the airfield tower.

These and other objects and advantages of the invention will be more fully understood by referring to the following description and drawings wherein:

FIGURE 2 is an elevational view of a quick-erect stanchion looking parallel to the net;

FIGURE 3 is an elevational view of the quick-erect stanchion shown in FIGURE 2 looking parallel to the runway;

Figure 1:
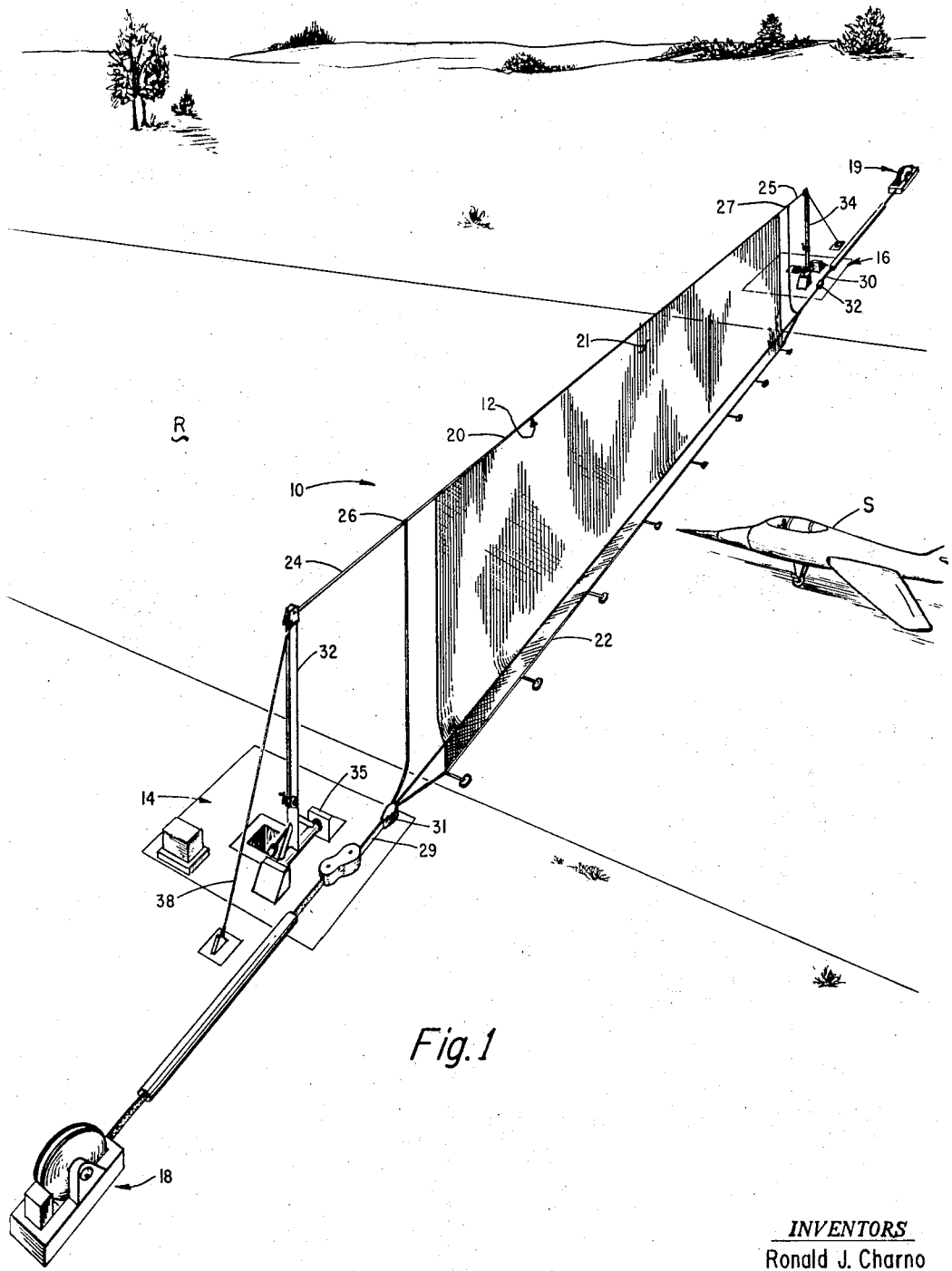
FIGURE 1 shows an aircraft arresting system including a barricade net, quick-erect stanchions for supporting and lifting the net and mechanical brake energy absorbers for bringing the aircraft to a controlled stop.

Referring now to the drawings wherein the showings are for the purpose of illustrating a preferred embodiment of the invention only and not for the purpose of limiting same, FIGURE 1 shows a barricade net arresting system 10 comprising a net 12, stanchion installations 14, 16 on each side of a runway R and mechanical brake energy absorber units 18, 19 attached to each end of the net 12 for bringing an aircraft S to a controlled stop within the allowable runway space. The net 12 is preferably of fabric construction in which an upper strap 20 supports a plurality of vertical webs 21 attached to a lower strap 22. Cables 24, 25 are attached to the net by means of cable-to-net shear connections 26, 27. The ends of the upper and lower straps 20 and 22 are connected to purchase tapes 29, 30 of the mechanical braking units 18, 19 by means of tape-to-net connectors 31, 32. Both the upper and lower straps 20, 22 are stretched taut by tensioning cables 24, 25 and tapes 29, 30 in a known manner. It will be understood that as the aircraft S engages the net 12 in the ready position (FIGURE 1), the cable-to-net shear connections 26, 27 break and the net envelopes the aircraft. As the aircraft and net proceed down the runway, the tapes 29, 30 are paid out under the restraining braking torque of the energy absorbing units 18, 19 to bring the aircraft to a controlled stop.

Each stanchion installation 14, 16 includes a net stanchion 32, 34 (FIGURES 2 and 3). In accordance with the preferred embodiment of the invention, each stanchion 32, 34 is pivoted near ground level on a pair of pillow blocks 35 so that it is raised and lowered parallel to the runway R. The stanchion 32 on the near side of the runway is shown in FIGURE 2 with the observer looking parallel to the net and in FIGURE 3, looking parallel to the runway. A winch and brake device 37 is attached to each stanchion for tensioning cables 24, 25 and the strap 20 of the net. A guy wire 38 maintains the vertical stability of each stanchion during the raising and lowering cycles. An hydraulic actuating cylinder 40 is pivoted at its lower end below ground level and the piston rod 42 thereof is connected to the stanchion at a point permitting the stanchion to be fully lowered to a horizontal position as shown by the dot-dash lines in FIGURE 2.

HYDRAULIC SYSTEM

Figure 4:
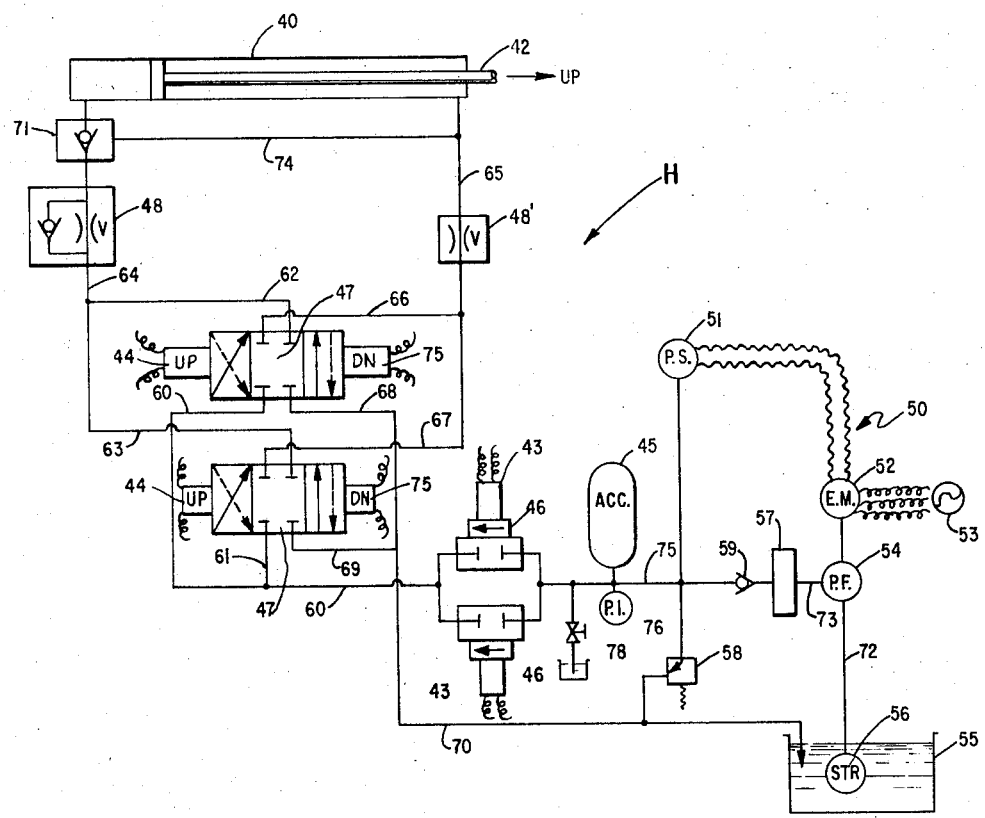
FIGURE 4 is an hydraulic system schematic provided for each net stanchion.

Referring to FIGURE 4, a hydraulic system H is shown schematically which is provided for each stanchion installation 14, 16. Each system H includes an accumulator 45, dual solenoid cutoff and directional valves 46, 47, flow control valves 48, 48' and an automatic accumulator recharge unit 50. The automatic accumulator recharge unit consists of a pressure switch 51, electric motor 52, motor starter relay 53, hydraulic pump 54, reservoir 55, strainer 56, filter 57 and relief and check valves 58, 59. Normally closed dual directional valves 47 and dual cutoff valves 46 are redundant to the system to provide maximum reliability of operation, particularly on the up portion of the cycle. Each system H is pressurized equally so as to insure synchronous operation of the actuating cylinders 40.

When the net is to be raised, each solenoid 43 and each "up" solenoid 44 of the valves 46, 47 are energized opening them to fluid flow. Fluid flow is from the accumulator 45 through each cutoff valve 46, lines 60, 61, and each directional valve 47. The "up" diagonal, directional arrow (solid lines) on each valve 47 indicates the path of travel of the fluid from lines 60, 61 to lines 62, 63. From lines 62, 63, the flow is to line 64, the flow control valve 48 and into the lower end of actuating cylinder 40 below the piston 42 which causes the net to be lifted. Fluid above piston 42 is returned via line 65, flow control valve 48', lines 66, 67 to each directional valve 47. The "up" diagonal, directional flow arrows (dotted lines) indicate return fluid flow through the valves 47 and to lines 68, 69 and line 70 for ultimate return to the reservoir 55.

The automatic accumulator recharge unit 50 will cut in when pressure switch 51 senses a pressure drop below its setting. Motor 52 is started driving pump 54 to recharge the accumulator through lines 72, 73, filter 57, check valve 59, and line 75. Pressure switch senses that pressure has been restored to the accumulator 45 and the recharge unit 50 cuts out. Gauge 76 gives a visual indication of hydraulic system pressure.

With the net fully raised, a positive fluid lock is maintained by means of a pilot operated check valve 71. The fluid introduced into the lower end of the actuating cylinder 40 to raise the stanchions is trapped there by the check valve 71. Return flow is not possible until high pressure fluid is introduced on the upper side of the piston 42 for the down cycle described hereinbelow. Then, high pressure fluid in the pilot line 74 opens the check valve 71 and allows the blocked fluid to return to the reservoir 55.

On the down cycle, fluid flow is into the top of actuating cylinder 40 so as to move the piston 42 down lowering the barricade net. Since the "down" solenoids 75 of each directional valve 47 are energized and the "up" solenoids 44 de-energized, fluid flow through each valve 47 is indicated by the "down" parallel, directional arrows. Fluid flows from the accumulator 45 through lines 60, 61, taking a path through each directional valve 47 indicated by the parallel, directional arrows (solid lines) to lines 66, 67, thence to flow control valve 48' and into the actuating cylinder 40. Fluid return, upon release of check valve 71, is through line 64, flow control valve 48, lines 62, 63, and each directional valve 47 through which flow is indicated by the "down" directional arrows (dotted lines); then to lines 68, 69 and 70 for return to the reservoir 55.

Directional valves 47 may be of a variable flow type. Thus the resulting cycle performance times can be varied by adjusting the flow control settings and system pressure. For example, lowering time is increased by closing the "down" flow path a small amount and decreased by opening it a small amount. The lifting time may be changed in a similar manner and by increasing or decreasing the pressure setting of pressure switch 51. Final synchronization is accomplished by observing several operating cycles and adjusting the control valve settings and system pressure as necessary to obtain closely coordinated up and down times. These cycles can be performed manually or by a remote control unit usually mounted in the airfield tower.

SYSTEM CONTROL

Figure 5:
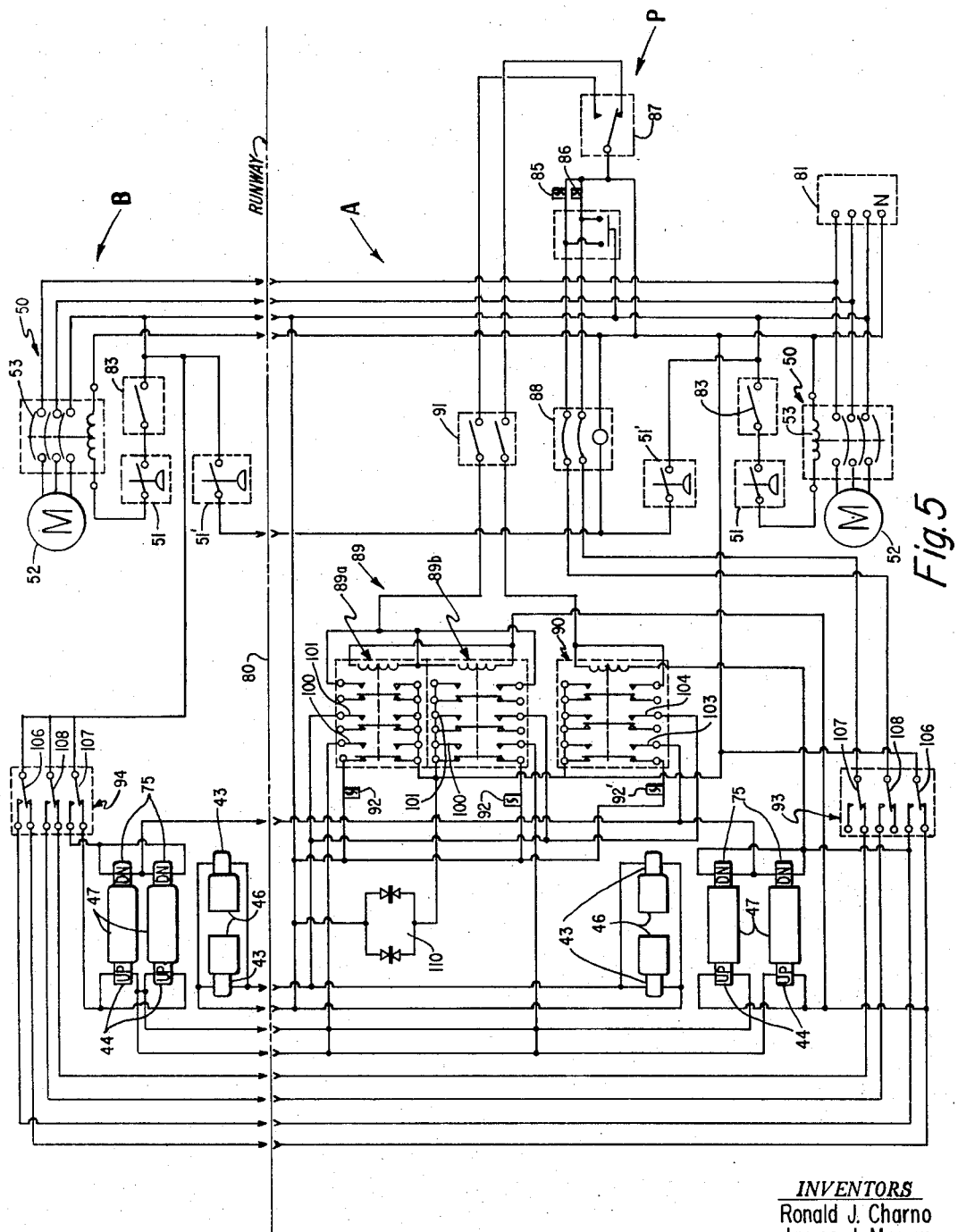
FIGURE 5 is an electro-hydraulic circuit diagram of the master control.

FIGURE 5 shows an electro-hydraulic schematic of the stanchion control. Parts appearing also in the hydraulic system diagram in FIGURE 4 are represented by the same numerals in FIGURE 5. The control circuit embraces each hydraulic system H of both stanchions. The runway is represented by the dot-dash line 80 which divides the system into near and far side sections A, B. The motors 52 of the automatic accumulator recharge units 50 operate on three phase power from the junction box 81. Each motor starter relay 53 and pump cutoff switch 83 is housed in a separate enclosure mounted next to the motor-pump assembly.

The operating control portion of the electro-hydraulic system operates on single phase power. Generally, it includes provisions for remote operation from control panel P, usually installed in the control tower, automatic termination of operating cycles by limit switches 93, 94, automatic control of accumulator recharge by units 50 and remote visual indication of stanchion position and low hydraulic pressure by signal lamps 85, 86 at the control panel P. Certain control elements of the electrical system are included in only one of the power sections, the near side section A, such as a low pressure warning flasher 88, "up" and "down" three-pole relays 89, 90, manual operation safety switch 91 and relay status lights 92, 92'. The limit switches 93, 94 are located one on each pillow block 35 which supports each stanchion. These are cam actuated switches and operate in the circuit to terminate the up or down operating cycles. Relay 89 includes dual, three-pole, double throw banks 89a, 89b comprising redundant signal transmission paths to insure raising the stanchions. Relay 90 has a single three-pole, double throw bank for controlling the lowering cycle. When "up" relay 89 is energized, contacts 100 control the "up" solenoids 44 of each directional valve 47 and contacts 101 control the solenoids 43 of each cutoff valve 46. When "down" relay 90 is energized, contacts 103 control the "down" solenoids 75 of each directional valve 47 and contacts 104 the solenoids 43 of cutoff valves 46. In the stanchion down position the "up" relay operating circuit is in readiness through contacts 106 of limit switches 93, 94 (shown in the stanchion down position) and contacts 107 complete the circuit to the "down" position control light 86 on the control panel P. When the stanchion is raised, contacts 108 close illuminating the "up" position light 85 while contacts 106, 107 cut off power to the "up" relay 89 and turn off the "down" position light 86 respectively. The circuit is then in readiness through contacts 106 for operation of the "down" relay 90.

To eliminate undesirable surges and possible shock loads to the hydraulic system, the electrical system includes a surge suppressor 110. The electrical system readiness can be determined by inspection of the relay status lights 92, 92' which should all be on when the relays 89, 90 are de-energized. In addition, the signal lamp 86 should be on showing that the stanchion is in the down position. The relays 89, 90 are shown de-energized and the operating switch 87 of the control panel P is shown in the "down" position.

When the tower operator selects the "up" position of the operating switch 87, current flows to the dual "up" relay 89 of the master power package. This in turn permits current flow to the dual cutoff valves 46 and directional valves 47 energizing the solenoids 44, 43. The valves 46, 47 shift from the normally closed position and the resulting fluid flow is as described in FIGURE 4 which lifts the stanchions. The relay status lights 92 and the "down" position light 86 in the tower will go out. Fluid flow continues until completion of stanchion travel which moves the limit switches 93, 94. When both limit switches shift, current to the "up" relay 89 is cut off and the solenoid actuated valves 46, 47 return to their normally closed positions and the relay status lights 92 go on again. Shifting of the limit switches 93, 94 also illuminates the "up" position light 85 in the tower. The accumulator recharge units 50 begin to function as soon as the primary switches 51 sense a drop in pressure. The same pressure drop is sensed by secondary pressure switches 51' which energize the low pressure warning circuit flasher 88. This causes the "up" position light 85 in the tower to blink at a rate of 45 times a minute until the desired operating pressure has been recovered.

For lowering the stanchions, the operating switch 87 in the tower is placed in the "down" position. This energizes the "down" relay 90 and permits current to flow to the cutoff and directional valve solenoids 43, 75. The valves 46, 47 shift and fluid flow is as previously described with respect to FIGURE 4. During down travel, the relay status light 92' goes out and the "up" position light in the tower goes out also. Fluid flow continues until the stanchion travel returns the limit switches 93, 94 to their original position. Shifting of the limit switches 93, 94 cuts off current to the "down" relay 90 and to the solenoids 43, 75 of the valves 46, 47. Upon completion of the down cycle, the relay status light 92' goes on again and the "down" position light 86 in the tower is illuminated. The accumulator recharge units 50 and pressure warning circuit operate as described for the up cycle.

In accordance with the invention, it will be seen from the foregoing that the net is maintained taut not only in its terminal positions, but also while being moved between these positions. This is especially important where lifting takes place rapidly (two or three seconds) in order to keep the net from oscillating wildly in the ready position. As aforementioned, a further advantage of the invention is the roll-over feature of aircraft traffic obtainable with a taut net in the down position. In that position, the net lies practically flat against the runway due to the low pivotal position of the stanchions and being taut, is not subject to fast air currents created by aircraft movement or pick-up and entanglement due to contact with the aircraft wheels.

Having now described a preferred embodiment of the invention, it will be appreciated by those skilled in the art that certain modifications may be made without departing from the invention described in the appended claims.

We claim:
1. In combination with an aircraft arresting system comprising a cross-runway barrier member adapted to be engaged by an aircraft upon landing supported at each end by a pair of stanchions mounted on opposite sides of the runway for movement between raised and lowered positions,
    an actuating and control means for operating said stanchions and synchronizing their movements comprising
        a fluid actuated cylinder connected to each stanchion for raising and lowering the same,
        solenoid operated valve means for controlling the flow of fluid to said cylinders to initiate the raising or lowering motions,
        relay means for controlling valve actuation in raising said stanchions,
        other relay means for controlling valve actuation in lowering said stanchions,
        switch means for alternately energizing said relay means, and
        limit switch means associated with each stanchion for de-energizing the respective relay means at the terminal position of said stanchions in either the raised or lowered position.
2. The combination according to claim 1 wherein said actuating and control means includes:
    an accumulator connectable to each actuating cylinder by said solenoid operated valve means,
    means for recharging the accumulator simultaneously with cylinder actuation including,
    a pressure sensitive switch connected to sense accumulator pressure, and
    a motor-pump unit continuously responsive to said switch and hydraulically connected to the accumulator for recharging the same during stanchion operation whereby system readiness is preserved.
3. The combination according to claim 2 wherein a check valve is located in the hydraulic system relative to the actuating cylinder for hydraulically locking fluid within said cylinder to retain the stanchions in the vertical up position, said check valve being responsive to accumulator pressure for initiating the lowering movement of the actuating cylinder to relieve said locked condition.
4. The combination according to claim 1 wherein the cross-runway barrier member is a flexible barricade net and each stanchion is pivotally mounted to swing in an arc parallel to the runway including means for tensioning the net between the stanchions so that it remains taut while being moved between the raised and lowered positions.
5. In combination with an aircraft arresting system comprising a cross-runway barrier member adapted to be engaged by an aircraft upon landing supported at each end by a pair of stanchions mounted on opposite sides of the runway for movement between raised and lowered positions,
    an actuating and control means for operating said stanchions and synchronizing their movements comprising
    separate energy storage means associated with each stanchion,
    means sensing the respective energy level of each storage means, and
    recharging means responsive to the sensing means for restoring the desired energy level during either raising or lowering movements of the stanchion whereby system readiness is maintained for rapid sequential cycling.

References Cited

UNITED STATES PATENTS

| | | | |
|---|---|---|---|
| 2,221,874 | 6/1943 | Tandler et al. | 60—51 |
| 2,783,957 | 3/1957 | O'Neil et al. | 244—110 |
| 3,128,972 | 4/1964 | Fonden et al. | 244—110 |

FERGUS S. MIDDLETON, *Primary Examiner.*

MILTON BUCHLER, *Examiner.*

P. E. SAUBERER, *Assistant Examiner.*